United States Patent [19]

Qi et al.

[11] Patent Number: 5,569,756
[45] Date of Patent: Oct. 29, 1996

[54] PURIFICATION OF CHEMICALLY MODIFIED CYCLODEXTRINS

[75] Inventors: Z. Helena Qi, Munster; Allan Hedges, Crown Point; Eduardo Sanchez, East Chicago, all of Ind.

[73] Assignee: American Maize-Products Company, Hammond, Ind.

[21] Appl. No.: 408,062

[22] Filed: Mar. 21, 1995

[51] Int. Cl.$^6$ ............................. C07H 1/06; C07H 1/00; C08B 37/16; C07G 17/00
[52] U.S. Cl. ......................... 536/127; 536/124; 536/103; 536/1.11; 536/123.1
[58] Field of Search .................................. 536/127, 124, 536/103, 1.11, 123.1

[56] References Cited

U.S. PATENT DOCUMENTS

| | | | |
|---|---|---|---|
| 3,803,033 | 4/1974 | Sutherland | 536/127 |
| 5,094,761 | 3/1992 | Trinh et al. | 536/127 |
| 5,139,687 | 8/1992 | Borgher, Sr. et al. | 536/127 |
| 5,371,209 | 12/1994 | Shieh et al. | 536/127 |
| 5,403,828 | 4/1995 | Lewis et al. | 514/58 |
| 5,407,442 | 4/1995 | Karapasha et al. | 536/127 |

FOREIGN PATENT DOCUMENTS 59-148794  8/1984  Japan .

OTHER PUBLICATIONS

Erskine et al, Chem Engineering Progress, vol. 67, No. 11, 1971.
Hawley's Condensed Chemical Dictionary, 11th Edition, 1987, pp. 218–219.
Calgon Carbon Corp. Aug. 1987, Bulletin 23–142a, "Type CPG LF 12×40 mesh Granular Carbon", two pages.
Chemical Engineering Progress, Nov. 1971, (vol. 67, No. 11), "Activated Carbon Processes for Liquids"—pp. 41–44).
Calgon Carbon Corp. brochure—"Granular Activated Carbon/Pure & Simple"—24 pages.
Calgon Carbon Corp.—"Designing Adsorption Systems for Liquid Phase Processes"—1979, 6 pages.
Calgon Carbon Corp.—"Calgon Carbon Accelerated Column Test" No. 27–79a, 4 pages.
Calgon Carbon Corp.—"Granular Carton: How It Works" No. 27–27b—1 page.
Calgon Carbon Corp.—"The Laboratory Evaluation of Granular Activated Carbons"—No. 23–60d Jun. 1989, pp. 1–8.
Calgon Carbon Corp.—Technical Bulletin—No. T1005–Jun. 1993, "Defining Product Properties"—1 page.
Cincinnati Water Works—brochure—"GAC. The Quest for Safe Water"—pp. 1–8.
Calgon Carbon Corp.—brochure—No. 27–46d, "Effective Odor Control with Calgon Carbon . . . "—pp. 1–12.
Calgon Carbon Corp.—folder—No. BF001–Jun. 1993 "Activated Carbon Products Systems and Services".

Primary Examiner—John Kight
Assistant Examiner—Louise Leary
Attorney, Agent, or Firm—Lucas & Just

[57] ABSTRACT

Chemically modified cyclodextrins such as hydroxypropyl cyclodextrins are purified by treatment with an activated carbon made from either coal or coconut shells. The amount of activated carbon used is 50% to 300% by weight of modified cyclodextrin. The treatment removes organic impurities such as glycol introduced during the chemical modification process of the cyclodextrin. The treatment step is conducted by passing an aqueous solution of the unpurified modified cyclodextrin through a column packed with the activated carbon or by adding the activated carbon to a container of the unpruified modified cyclodextrin and mildly agitating the contents of the container to remove the impurities.

7 Claims, No Drawings

PURIFICATION OF CHEMICALLY MODIFIED CYCLODEXTRINS

This invention relates to cyclodextrins and, more specifically, to a process for purifying chemically modified cyclodextrins using activated carbon obtained only from coal or coconut shells, in a liquid phase.

A variety of chemically modified cyclodextrins, such as hydroxypropyl, hydroxyethyl, and sulfated derivatives, have been found eminently useful for pharmaceutical purposes. The purity of these products, therefore, becomes an important issue.

Modified cyclodextrins are synthesized by reacting an unmodified cyclodextrin with various chemical reagents. During the chemical synthesis, organic impurities are generated either as by-products or as residual reaction solvents. These organic impurities are conventionally removed by precipitation using a volatile "purifying solvent" such as acetone, methanol or ethanol. After separating the precipitated product, the residual purifying solvent in the product is then removed through distillation.

For example, in order to purify hydroxypropyl cyclodextrins, a reaction mixture is first concentrated by evaporating water and then precipitated using methanol and acetone. The recovered precipitate is washed with acetone, and the by-product, oligopropylene glycol which remains in the liquid phase, is separated from the product as a precipitated gum. However, as the degree of substitution (D.S.) of a product increases, the gummy precipitate gets increasingly stickier due to its increased solubility in the solvent mixture. When the D.S. approaches 7 or higher, the product gum becomes extremely difficult to handle, and a significant product loss has been observed. Similar problems are encountered in the synthesis of hydroxyethyl derivatives. In other cases, when organic solvents are used for chemical reactions, such as N,N-dimethylformamide (DMF) employed in synthesizing sulfated cyclodextrins, the conventional solvent-wash method cannot completely remove the residual DMF. The conventional solvent-wash process is, therefore, low in efficiency, high in cost, and hazardous. As the environmental concerns arise, reduction or elimination of volatile organic compounds becomes an increasingly urgent issue. Therefore, development of an alternative method is highly necessary.

In the past, activated carbon has been used to remove impurities from both gases and liquids. For example, activated carbon is used to clean up waste water and to purify drinking water. Activated carbon is manufactured by the destructive distillation of various carbonaceous materials such as wood, coconut shells, bones, peat, paper mill waste (lignin), coal, petroleum residue, and lignite. Typically, activated carbon is divided into groups depending on whether it is used for liquid-phase separation or gas phase separation. Conventionally, lignite, coal, bones, wood, peat and paper mill waste are most often used to manufacture activated carbon intended for liquid-phase use, while coconut shells, coal and petroleum residues are most often used to manufacture gas-adsorbent activated carbon.

It has now been discovered that activated carbon obtained from coal and coconut shells can remove impurities from modified cyclodextrin in liquid phase. This is both surprising and unexpected since other forms of activated carbon, e.g. wood, have been found not to be efficient for removing impurities from liquid phase modified cyclodextrins.

It has also been found that zeolite is not effective in accomplishing the purification of modified cyclodextrins in liquid phase. This further highlights the surprising and unexpected nature of the present invention.

The process of the present invention is also surprising and unexpected because of the quantity of activated carbon necessary in order to accomplish the present invention. Conventionally, the amount of activated carbon used to remove impurities, i.e. color impurities, is less than about 5% by weight of treated product. In the present invention it has been found that the amount of activated carbon should be about 50% to about 300% by weight of modified cyclodextrin. It has been found that at lower quantities, e.g. 5%, the present invention did not work.

More specifically, it has been discovered that activated carbons made from either coal or coconut shell, when used in large quantity (about 50% to about 300% by product weight), are very effective in removing organic impurities from aqueous solutions of the chemically-modified cyclodextrins. The purification process of the present invention can be conveniently carried out, either in batch or column operation. The activated carbon can be recycled chemically or thermally for repeated use.

In comparison with the conventional method for purifying modified cyclodextrins, the new process is significantly more efficient, versatile, cost-effective, and hazard-free.

Broadly, the process of the present invention comprises the steps of: treating an aqueous solution of impure chemically modified cyclodextrin with activated carbon made from coal or coconut shell in an amount of about 50% to about 300% by weight impure cyclodextrin for a period of time of about 1 to about 10 hours at a temperature of about 30° C. to about 50° C.; and recovering a purified chemically modified cyclodextrin.

Any source of activated carbon from coal or coconut shell can be used; however, it is preferred to use activated carbon of medium activity. More specifically, it has been found that Calgon Carbon Corporation of Pittsburgh, Pa. sells activated carbon from both coal and coconut shells and that such activated carbon works in the present invention. Calgon sells activated carbon from coal under the trademarks CPG, APA and PWA; while activated carbon from coconut shells is sold under the trade names OLC and PCB. Medium activated carbon sold by Calgon under names OLC and CPG is preferred as the source of carbon in the present invention.

The carbon can be in granular or powdered form; granular being preferred for column separations, while powdered has been found to work well in batch operations. Activated carbon in the granular form having a particle size in the range of about 10 mesh (1.68 mm sieve opening) are preferred for use in the present invention. More specifically, granular carbon particles having U.S. mesh sizes of 12×30, 12×40 and 20×50 are preferred in the present invention. The powdered carbon used in the present invention preferably has a mesh size of about 325 (0.044mm sieve opening).

The treatment is conducted at a temperature of about 20° C. to about 50° C. and, more preferably, at about 25° C. It has been found that at higher temperatures, e.g. 60° C., the efficiency of the present invention is poor.

The solids level of the aqueous solution should be about 25% to about 50% and, more preferably, about 35%. Generally, the higher the concentration, the longer the treatment time.

The pH of the aqueous solution should be about 4 to about 8 during treatment and, more preferably, about 7.

During treatment, the activated carbon is in physical contact with the aqueous solution of impure cyclodextrin for about 1 to about 10 hours and, more preferably, about 2 to about 8 hours. Good results have been obtained with a treatment time of about 5 hours in the present invention. Naturally, treatment times will vary depending on whether it is a batch operation or a continuous operation; the type of carbon used; and the concentration of the aqueous solution in which the modified cyclodextrin resides.

The treatment step can be conducted in either a batch or a continuous operation in a conventional manner using conventional equipment.

Batch operations are conducted by adding activated carbon to a container of impure modified cyclodextrin and then gently stirring the contents of the container so as to maintain the carbon suspended in the solution. Either granular or powdered carbon can be used in a batch operation.

In a continuous operation a column is used. The column is packed with granular carbon in a conventional manner and an aqueous solution containing impure modified cyclodextrins is pumped through the column in a conventional manner.

It has been found that in a column operation, it is best to wash the column first, with water, to remove silicas that are in the activated carbon. Washing is accomplished by passing water through the column until the effluent water from the column is clear.

Once the carbon has become saturated with impurities, it is recycled in a conventional manner using conventional equipment. Good results have been obtained by burning-off (pyrolysis) the impurities trapped by the carbon. An acid wash has also been found to remove the glycol from the carbon.

These and other aspects of the present invention may be more fully understood by reference to one or more of the following examples.

EXAMPLE 1

This example illustrates the removal of oligoethylene glycol from hydroxyethyl-beta-cyclodextrin A 40% solution was made from a sample of hydroxyethyl-beta-cyclodextrin (HEBCD, 25 g), which contained residual oligoethylene glycol of 1.84% on dry HEBCD weight basis. Twelve and one-half (12.5) grams of granular activated carbon from coal (CPG-LS 12×40, Calgon Carbon Corp.) was stirred with the HEBCD solution at ambient temperature for 30 minutes and filtered. The procedure was repeated once, and the product was recovered through freeze-drying. The residual oligoethylene glycol in the treated HEBCD was determined to be 0.89%. When the experiment was repeated using powdered carbon from wood charcoal in place of the granular carbon, the oligoethylene glycol content was not reduced.

EXAMPLE 2

This example illustrates the removal of oligopropylene glycol from hydroxypropyl-beta-cyclodextrin.

A 46% (w/v) solution of hydroxypropyl-beta-cyclodextrin (25 mL, 11.5 g dry material) containing oligopropylene glycol of 8.61% was mixed at 25° C. with 10 grams of granular activated carbon from coconut shells (OLC 20×50, Calgon Carbon Corp.) and stirred for 5 hours. The product was recovered through filtration and freeze-drying. The residual oligopropylene glycol in the treated product was determined to be 0.15%.

EXAMPLE 3

This example illustrates the removal of oligopropylene glycol from hydroxypropyl-gamma-cyclodextrin.

A column of 100 inches in length and 6 inches inside diameter was packed with 18 kilograms of granular activated carbon from coal (CPG-LS 12×40, Calgon Carbon Corp.). The column was rinsed with distilled water until the effluent was clear in appearance to the human eye. Through this column, about 13 gallons of a 39% solution of hydroxypropyl-gamma-cyclodextrin containing oligopropylene glycol of 5.65% was passed at a flow rate of 1.44 gallons per hour at 25° C. (treatment time of about 3.4 hours). Five gallons of distilled water was then pumped through the carbon column following the product mixture. The effluent was collected and spray dried to yield 18 kilograms of purified product that contained no detectable residual oligopropylene glycol. The carbon column was washed with water, sodium hydroxide solution and/or any hydrochloric acid solution, water, and ready to be reused.

EXAMPLE 4

This example illustrates the removal of N,N-dimethylformamide from sulfated gamma-cyclodextrin.

A 35% solution of sulfated gamma-cyclodextrin (1.1 kg dry material) was found to have a residual N,N-dimethylformamide (DMF) content of 454 ppm on dry product basis. At 25° C. the solution was pumped through a commercial cartridge (D8904, Barnstead/Thermolyne) packed with granular activated carbon (treatment time of about 1 hour. The product was eluted with water (1.3 L), then spray dried. No residual DMF was detected in the treated product.

It will be understood that the claims are intended to cover all changes and modifications of the preferred embodiments of the invention herein chosen for the purpose of illustration which do not constitute a departure from the spirit and scope of the invention.

What is claimed is:

1. A process for removing impurities from chemically modified cyclodextrin comprising the steps of:

(a) treating an aqueous solution of impure, chemically modified cyclodextrin with activated carbon made from coal or coconut shell in an amount of about 50 to about 300% by weight impure cyclodextrin for a period of about 1 to about 10 hours and at a temperature of about 20° C. to about 50° C.; and (b) recovering a purified chemically modified cyclodextrin.

2. The process of claim 1 wherein the activated carbon is medium activity.

3. The process of claim 1 wherein the activated carbon is either in powdered form or granular form.

4. The process of claim 1 wherein the aqueous solution of impure chemically modified cyclodextrin has a solid concentration of about 25% to about 50%.

5. The process of claim 1 wherein the aqueous solution of impure chemically modified cyclodextrin has a pH of about 4 to about 8.

6. The process of claim 1 wherein said treatment step comprises:

passing said aqueous solution of impure chemically modified cyclodextrin through a column packed with said activated carbon, said activated carbon being in granular form.

7. The process of claim 1 wherein said treatment step comprises:

adding said activated carbon to a container of said aqueous solution of impure chemically modified cyclodextrin and stirring the contents of said container.

* * * * *